April 16, 1963 D. J. WAYFIELD 3,085,356
SWIMMING INSTRUCTION DEVICES
Filed March 7, 1960 5 Sheets-Sheet 2
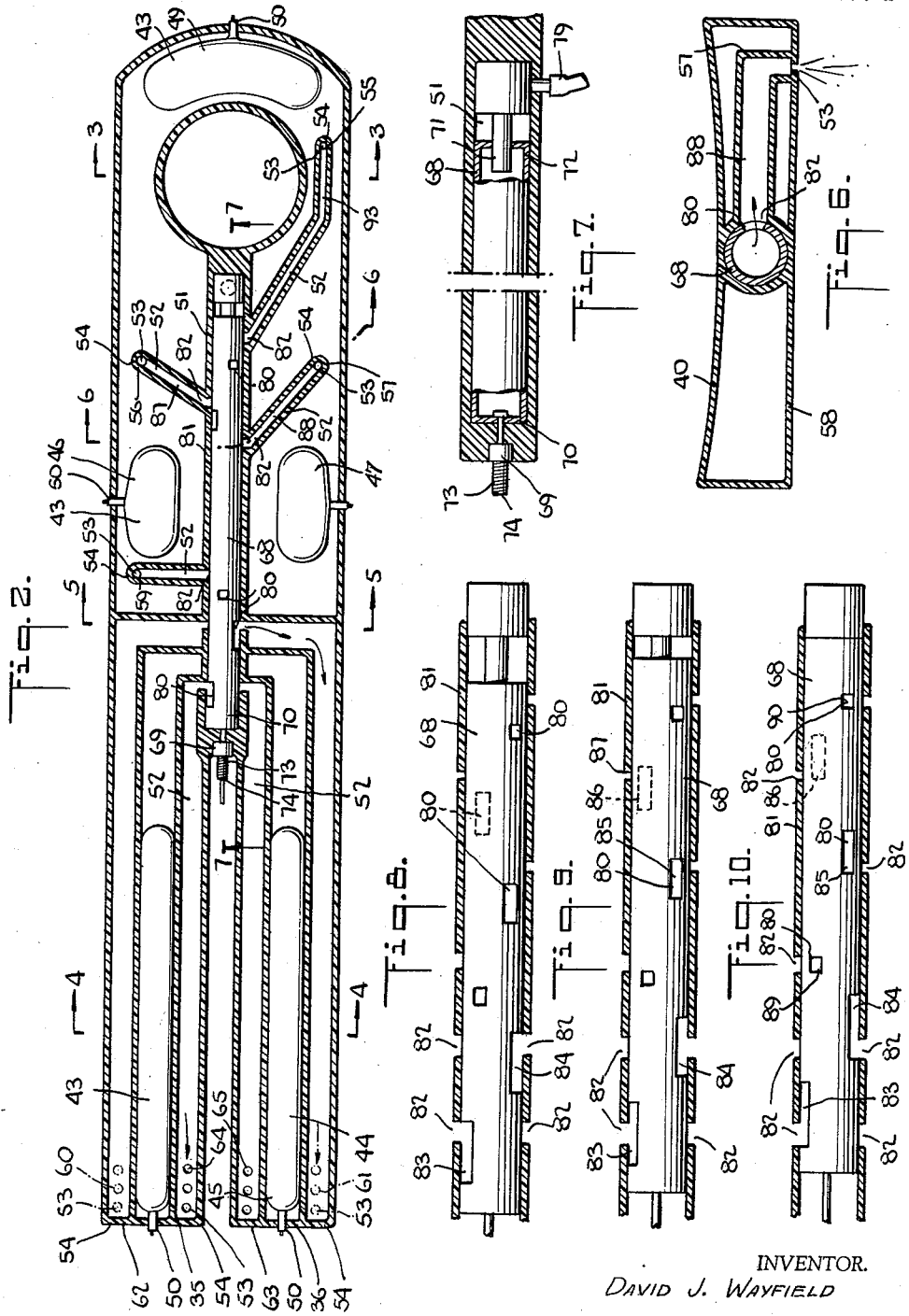
INVENTOR.
DAVID J. WAYFIELD
BY
Kenyon & Kenyon
ATTORNEYS

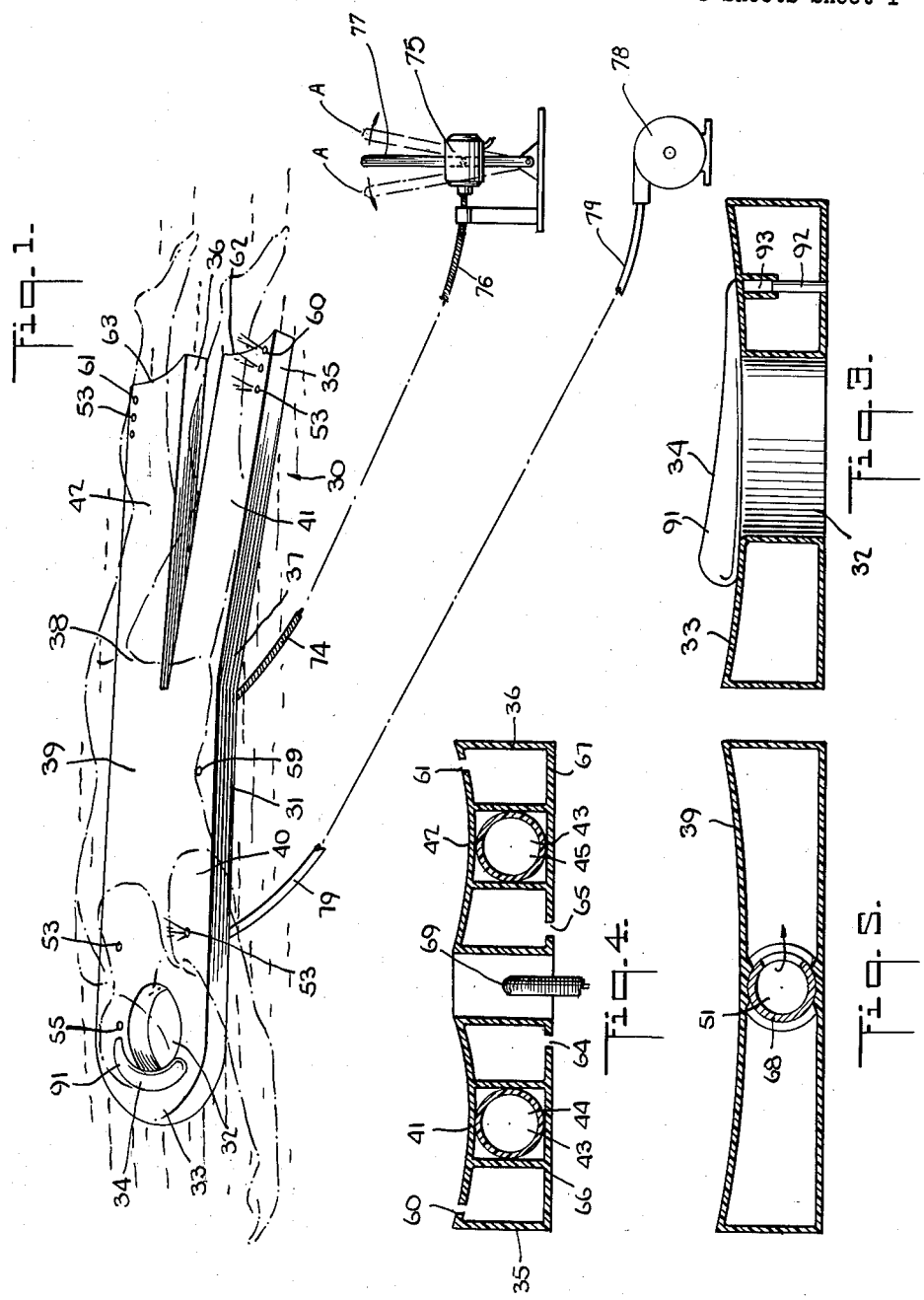

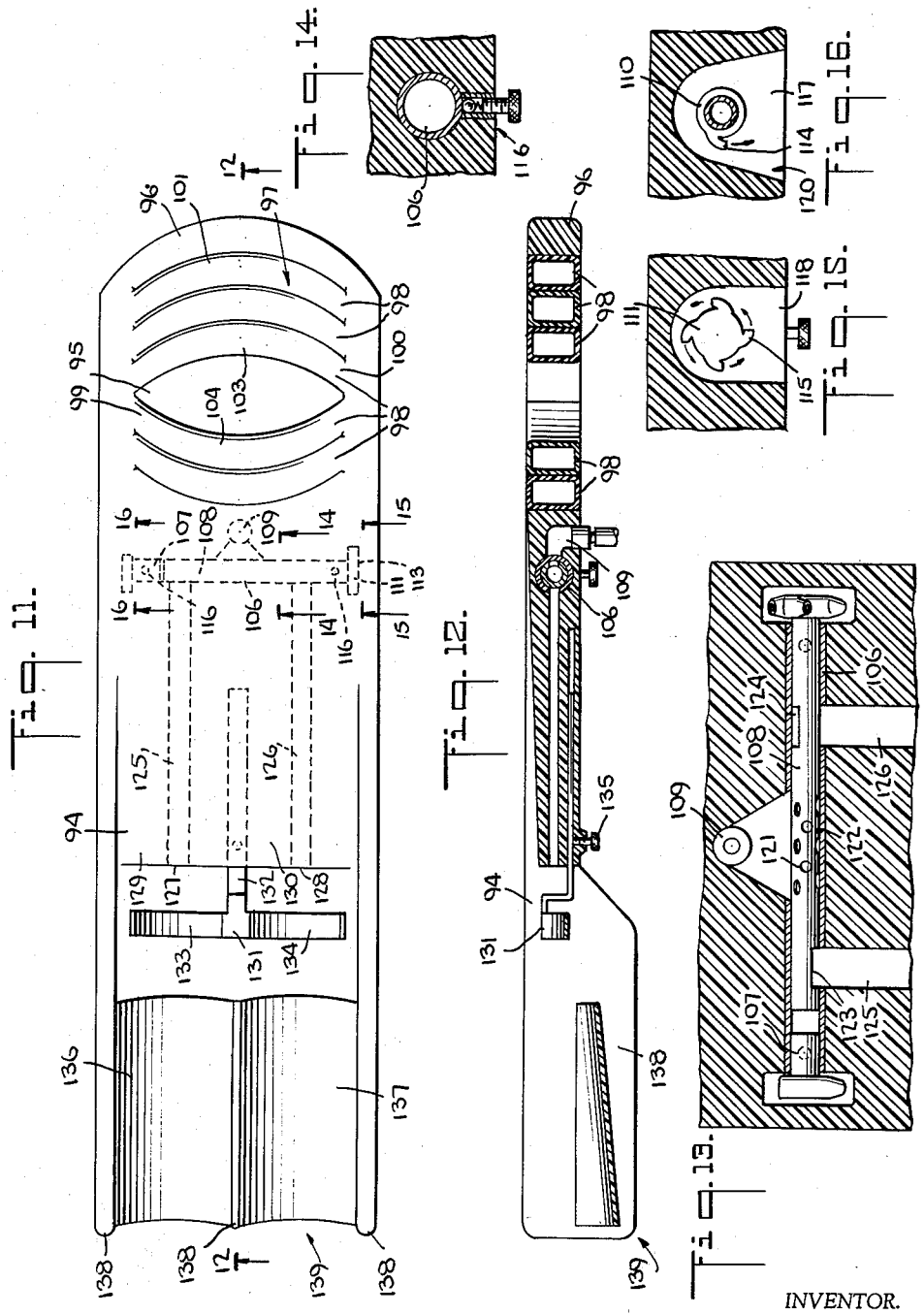

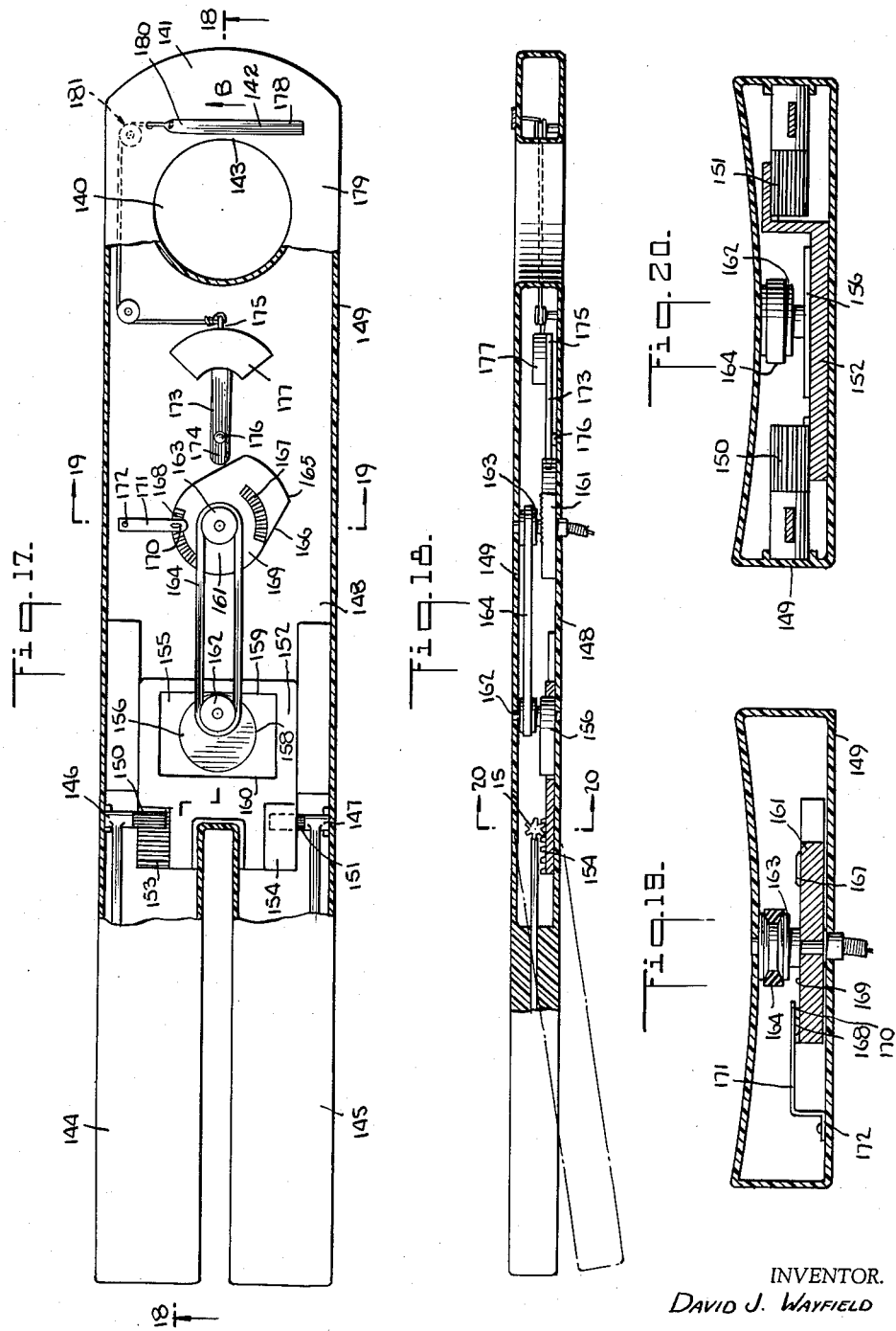

April 16, 1963 D. J. WAYFIELD 3,085,356
SWIMMING INSTRUCTION DEVICES
Filed March 7, 1960 5 Sheets-Sheet 5
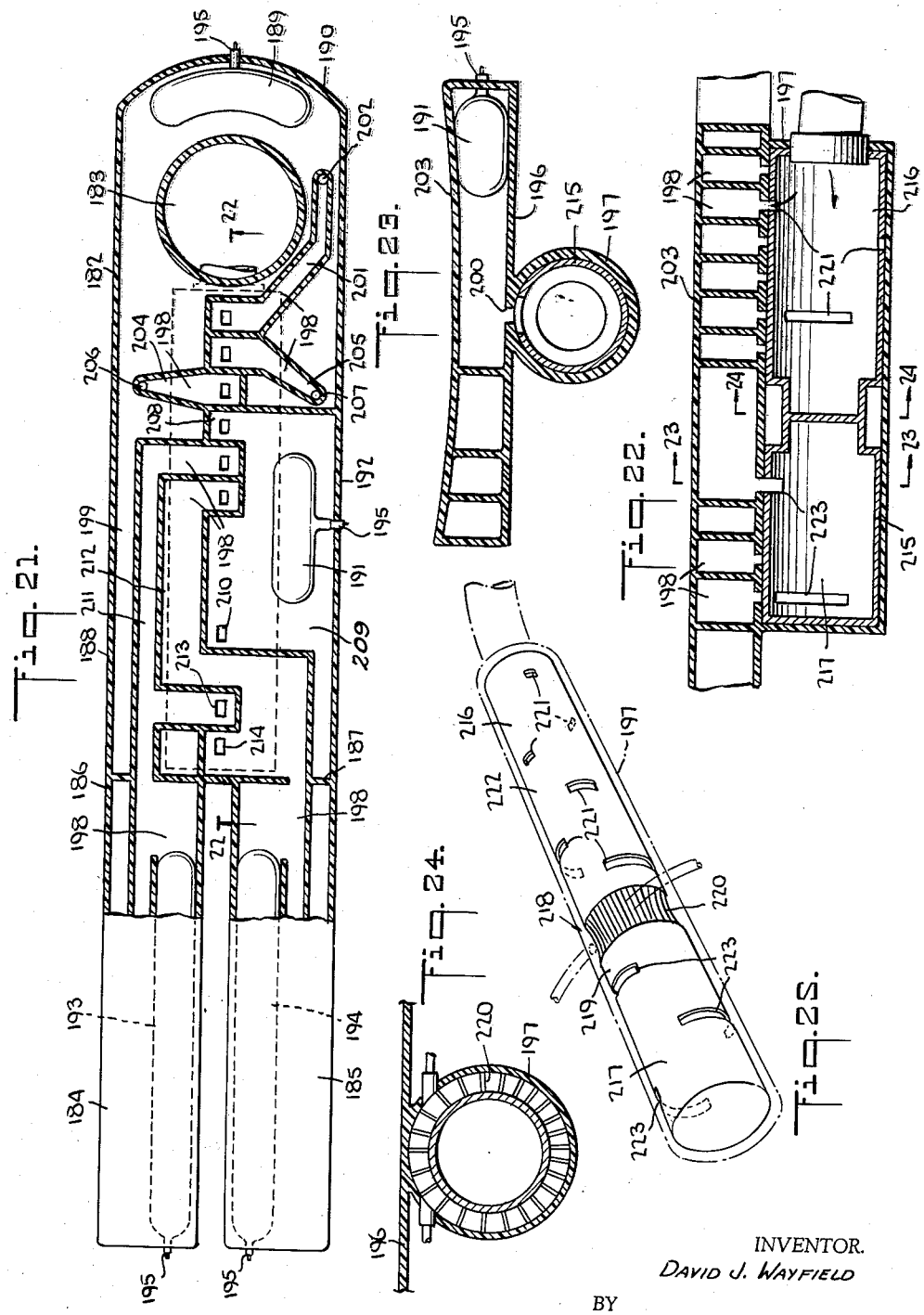
INVENTOR.
DAVID J. WAYFIELD
BY
ATTORNEYS

United States Patent Office 3,085,356
Patented Apr. 16, 1963

3,085,356
SWIMMING INSTRUCTION DEVICES
David J. Wayfield, 225 Liberty Ave., West Islip, N.Y.
Filed Mar. 7, 1960, Ser. No. 13,388
10 Claims. (Cl. 35—29)

This invention relates to apparatus for use in giving swimming instruction and more particularly to such devices which provide floating support for the swimming student and provide a series of indications at various parts of the body for appropriate coordination in the execution of swimming strokes.

This application is a continuation in part of my copending application Serial No. 729,022, filed April 16, 1958, now abandoned.

Many devices exist in the prior art directed to the problem of teaching swimming. Most of them are rather cumbersome mechanical contrivances which are used out of the water and consequently deprive the learner of experience with actual swimming conditions during the exact period of time when it is most important that such familiarity should be developing. Furthermore, most of the prior art devices require the strapping of the student's limbs to various moving elements of the apparatus which provides a somewhat artificial character to the instruction and forces, rather than guides, the limbs through the proper motions.

The present invention has been carefully contrived to avoid the disadvantages of the prior art devices and to cope with the many different problems which confront various people when they are learning to swim. The apparatus enables the swimming instructor to take the student through the various stages of instruction and enables the student to learn the various movements of the body and help to coordinate them.

The present invention permits the teaching of swimming in the proper medium, i.e. water. In addition, the apparatus permits the pupil to make mistakes. Thus the pupil's limbs are not forced through predetermined paths but he is given signals which enable him to properly execute and coordinate his limb movements.

It is an object of the present invention to provide apparatus for teaching swimming in the water and providing the student with signals indicative of proper limb coordination.

Another object is to provide a buoyant platform for swimming instruction which provides unobstructive use of the arms in executing swimming strokes and at least limited freedom of the legs for kicking, the device during use being unattached to the user's body.

Another object is to provide a device of the class described having adjustable buoyancy.

A further object is to provide such a device which can be controlled at a remote position out of the water and is adapted for simultaneous use with a plurality of similar devices for class instruction.

Other objects and features of the invention will become apparent in the following description and claims, and in the drawings in which:

FIG. 1 is a perspective view of one embodiment showing its general arrangement during use;

FIG. 2 is a plan view of the embodiment of FIG. 1;

FIG. 3 is an enlarged section taken along lines 3—3 of FIG. 2;

FIG. 4 is an enlarged section taken along lines 4—4 of FIG. 2;

FIG. 5 is an enlarged section taken along lines 5—5 of FIG. 2;

FIG. 6 is an enlarged section taken along lines 6—6 of FIG. 2;

FIG. 7 is an enlarged fragmentary section taken along lines 7—7 of FIG. 2;

FIG. 8 is an enlarged schematic of the valve member in its first axial position;

FIG. 9 is an enlarged schematic of the valve member in its second axial position;

FIG. 10 is an enlarged schematic of the valve member in its third axial position;

FIG. 11 is a plan view of another embodiment of the invention;

FIG. 12 is a section taken along lines 12—12 of FIG. 11;

FIG. 13 is an enlarged partially sectionalized elevation showing the rotary valve members;

FIG. 14 is an enlarged section taken along lines 14—14 of FIG. 11;

FIG. 15 is an enlarged section taken along lines 15—15 of FIG. 11;

FIG. 16 is an enlarged section taken along lines 16—16 of FIG. 11;

FIG. 17 is a cut-away plan view of another embodiment of the invention;

FIG. 18 is a section taken along lines 18—18 of FIG. 17;

FIG. 19 is an enlarged section taken along lines 19—19 of FIG. 17;

FIG. 20 is an enlarged transverse section of the platform taken rearward of the gear sectors on the leg supporting members;

FIG. 21 is a cut-away plan of another embodiment of the invention;

FIG. 22 is an enlarged section taken along lines 22—22 of FIG. 21;

FIG. 23 is an enlarged section taken along lines 23—23 of FIG. 22;

FIG. 24 is an enlarged section taken along lines 24—24 of FIG. 22; and

FIG. 25 is an enlarged perspective view of the rotating valve member.

Referring now to the drawings, FIG. 1 shows an aquatic device according to the present invention and is designated generally by the reference numeral 30. It consists of an elongated buoyant platform 31 adapted to receive the body of a swimming student as shown in phantom and has an opening 32 at its forward end 33 which is adapted to receive the face of the student, and has head rest means 34 located adjacent and forward of the opening 32 for supporting the head of the swimmer and providing other functions which will be described hereinafter.

At the rear of the device are a pair of leg supporting members 35, 36 which are flexibly connected at their inner ends 37, 38 to the main body portion 39 of the platform.

Such leg supporting members 35, 36 as well as other portions of the platform 31 can be appropriately shaped on the upper surface 40 to accommodate the particular portions of the body with which they will come into contact during use. For example, the leg supporting members 35, 36 may be constructed with longitudinal trough-shaped upper surfaces 41, 42 having general concave cross-sections as shown in FIG. 4.

The platform 30 is constructed of lightweight metallic or plastic material of any suitable kind, preferably of non-corrosive properties, and has a hollow compartmented internal structure as shown in FIGS. 1–6. A plurality of concealed inflatable air pockets or containers 43 are disposed at spaced positions within the interior of the platform as shown in FIG. 2, there being elongated air pockets 44, 45 in the respective leg supporting members 35, 36, smaller air pockets 46, 47 located at either side of the central portion 48 of the platform, and an elongated arcuate air pocket 49 located at the forward end which may or may not extend along both sides of the platform. Each of the air pockets 43 has valve means 50 extending exteriorly of the platform for inflation or deflation thereof as desired to adjust the buoyancy of the device as well as its fore and aft lateral trim.

Longitudinal cylindrical recess 51 is centrally disposed within said platform and axially aligned therewith and has a plurality of water channels or conduits 52 radiating therefrom at spaced positions along its length and terminating at the various positions as shown along the platform 31. Such channels 52 communicate with the interior of the cylindrical recess 51 and also with water outlets or pressure nozzles 53 at their outer ends 54. One such nozzle 55 opens on the upper surface 40 of the platform 31 adjacent the opening 32. Two other such nozzles 56, 57 open on the bottom surface 58 adjacent respective shoulder positions. Another nozzle 59 is directed to the upper surface 40 at one side thereof adjacent the mid-body position. Each of the leg supporting members 35, 36 have three nozzles 60, 61 respectively directed to their upper surfaces 41, 42 at the outer edges of their ends 62, 63, and corresponding sets of three nozzles 64, 65 directed to the bottom surfaces 66, 67 thereof at the inner edges of the ends 62, 63.

Rotatably disposed within the cylindrical recess 51 is a hollow cylindrical distributing valve member 68 which has external mechanical connecting means 69 at its rear end 70 and water inlet connection means 71 at its front end 72. (See also FIG. 7.) Affixed to the mechanical connection means 69 is one end 73 of a flexible cable 74 which transmits rotary power to the valve member 68 from electric motor 75 connected to the other end 76 of the cable. The motor 75 is located out of the water, for example, at the edge of a swimming pool, and has handle means 77 for shifting the motor longitudinally as shown by arrows A and thereby imparts such shifting motion through the cable 74 to the valve member.

Conventional pump means 78 is connected by means of hose 79 to the water inlet connection means 71 for delivering water to the interior of valve member 68. The valve member 68 has holes 80 in its surface 81 which are at axially spaced positions corresponding to those of the connections 82 of the water channels 52 with the cylindrical recess 51, and the holes 80 are radially oriented relative to one another in accordance with the time relation desired for delivery of water therethrough to the respective channels 52.

By shifting of the motor 75 as previously described the valve member 68 can be shifted longitudinally or axially relative to the cylindrical recess 51 into a series of three positions, one in which water is supplied through the valve member 68 to the leg supporting member nozzles 60, 61, 64 and 65 only, another in which water is supplied to the latter nozzles as well as nozzles 56, 57 for the shoulder positions, and the third in which water is supplied to all of the nozzles in a time sequence. These three positions are more clearly shown by referring to FIGS. 8, 9, and 10 respectively. In the first position, shown in FIG. 8, the rearwardly disposed elongated holes 83, 84 communicate at the appropriate points in their rotation with channel connections 82 for the leg members 35, 36, the rearward hole 83 alternately supplying water to the nozzles 60 and 61 on the upper surfaces of the leg members 35, 36 to cause resultant deflection of the leg members in a downward direction as viewed in FIG. 1 due to the reaction from expulsion of water from said nozzles. The forward elongated hole 84 similarly supplies water alternately to the channels communicating with the nozzles 64, 65 on the bottom surface of the leg supporting members 35, 36 to cause alternate upward deflection thereof in a corresponding manner. In this first position the other holes 80 are out of register with the associated channel connections 82 throughout rotation of the valve member 68 and as a consequence no water is supplied to the other nozzles.

In the second position, as shown in FIG. 9, since holes 83, 84 are substantially elongated, they still register with and supply water to the leg member channels, and in addition the shoulder channel holes 85, 86 come into register with the shoulder nozzle channels 87, 88 and water is thereby supplied at appropriate intervals to their nozzles 56, 57.

In the third position, as shown in FIG. 10, the leg channel holes 83, 84 and the shoulder channel holes 85, 86, having sufficient axial dimension, still register with their corresponding water channels and holes 89, 90 for the mid-body position nozzle 59 and the head position nozzle 55, respectively, become aligned with their associated channel connections 82, so that in a proper timed sequence water is delivered through all of the nozzles in the platform 31.

Although it is possible to have the shoulder position nozzles 56, 57 directed to the upper surface 40 of the platform, it is preferable that they be, as previously described, directed to the bottom surface 58, in which case the student gets a visual indication which can be seen through the hole or opening 32 when the pressure jets or aerated water are released from the respective nozzles 56, 57. When directed upwardly, the signal is effected by the water being impinged on the adjacent portion of the body, as is the case with the nozzle 55 at one side of the mid-section of the body.

Connected to the head position nozzle 59 and integral with said head rest means 34, is a flexible fluid-type pad or envelope 91 which is expansible in response to water delivered from the nozzle to apply turning force to the student's head resting thereon in view of the wedge-shaped contour of the pad when inflated as shown in FIG. 3. Discharge of water therefrom is provided by leakoff tube 92 interconnecting the water channel 93 externally of the platform 31 through its bottom surface 58.

Thus, the timed delivery of water to each of the water nozzles 53 as previously described, provide a signal or indication for the student using the platform 31 showing the desired movement of that particular portion of the body in proper coordination with the other portions of the body for the execution of swimming strokes.

Another embodiment is shown in FIGS. 11–16, which is comprised of a buoyant platform 94, having an opening 95 near its forward end 96 for receiving the face, and having an adjustable head rest means designated generally by the numeral 97 aligned within the opening 95 for supporting the head. Such head rest means consists of a plurality of flexible members or pneumatic tubes 98 laterally disposed across the opening 95 in side by side relation to one another and affixed to the platform at their ends 99, 100 by any convenient means. The intermediate portions 101 of each of the tubes 98 is of greater length than that of the opening 95 and are reciprocally shiftable against their resilience from forward to rearward arcuate positions as shown in FIG. 11, whereby the face receiving portion or open area 95 between oppositely positioned adjacent tubes 103, 104 can be adjusted longitudinally with respect to the platform 94 to accommodate different sizes of students or head positions.

Laterally disposed within said platform in an intermediate portion 105 thereof is a cylindrical recess 106 in which are disposed a shorter and a longer hollow cylindrical valve member 107, 108 respectively. Such members are rotatably disposed in said recess 106 in end to end relation (see also FIG. 13) and are capable of independent rotation relative to one another. Water inlet means 109 delivers water under pressure, supplied by an external pump or other conventional means (not shown) to the valve members 107, 108, each of which has water-driven means 110, 111 respectively, of the reaction type, which are affixed to their outer ends 112, 113 for imparting rotary motion thereto. The shorter valve member 107 has only one impelling or driving nozzle 114 on its water-driven means, whereas the longer valve member has four equi-spaced impelling nozzles 115 as shown. Adjustable speed control means 116, e.g. adjustable spring biased ball-bearings, are provided at intermediate positions along each of said valve members for selecting the rotational speed thereof. The aforesaid nozzles 114, 115 discharge through respective downwardly facing cavities 117, 118 in the bottom of said platform 94, the cavity 117 for the shorter valve member 107 having a flared opening 120 to provide visual indication to the swimmer through the open area 95 of water pressure discharge during approximately 230 degrees of the rotation of the latter valve member, providing time indication for arm strokes.

The longer valve member 108 has a plurality of holes 121 near its central portion 122 adjacent the water inlet means 109 to conduct water to its own interior as well as to that of the shorter valve member 107. In addition, the longer valve member 108 also has a pair of axially spaced and radially oriented openings 123, 124 which at preselected times during rotation of the valve member 108 are brought into register with respective water channels 125, 126 which communicate with the cylindrical recess 106 and have rearwardly disposed outlet ends 127, 128 respectively opening externally of the platform adjacent the thigh receiving portions 129, 130 to direct water streams against the thighs to indicate appropriate coordination of the legs in executing swimming strokes.

A kicking bar 131 is provided to the rear of said outlet ends 127, 128 and has a longitudinally disposed central shaft 132 rotatably mounted in the platform and is engageable with the thighs on either side of the shaft. The bar has outer concave portions 133, 134 adapted to receive the thighs and is swingable up and down about the shaft 132 in response to movement of the student's legs in kicking. The shaft 132 is longitudinally adjustable with respect to the platform by means of set screw 135. A pair of rearwardly inclined leg troughs 136, 137 made of flexible material, such as rubber or plastic or the like, are provided at the rear of the platform and at a lower elevation than that reached by the normal kicking of the legs. Three equi-spaced longitudinal fin members 138 are provided on the bottom 119 of the platform 94 at the rear end portion 139 thereof to provide navigational stability of the device.

The simplicity of the instant embodiment can readily be seen. Only water need be supplied for both the motive power and the indicating means. The entire structure can be made of molded plastic material, if so desired, and provides a simple but effective device for its intended purpose.

A third embodiment is shown in FIGS. 17-20 which utilizes no water distribution system at all, but rather is entirely mechanical in its operation. It is generally similar in overall dimensions to the first embodiment described above and has a hole 140 at its forward end 141 adapted to receive the face and has an elastic head rest means 142 adjacent the forward edge 143 of the hole 140. A pair of leg supporting members 144, 145 are flexibly connected at their inner ends 146, 147 to the main body portion 148 of the platform 149 and are movable in a generally perpendicular plane relative to the platform. The leg supporting members 144, 145 have respective gear sectors 150, 151 affixed thereto and a longitudinally slidable frame 152 has respective rack means 153, 154 meshing with said gear sectors 150, 151 and has a rectangular opening 155 therein. An eccentric cam 156 is rotatably mounted in said platform and disposed within the opening 155 in the frame 152 with its periphery 158 in sliding engagement or contact with forward and rearward portions 159, 160 of the opening to impart reciprocating fore and aft motion to the frame upon rotation of the cam, with resultant alternate up and down pivoting motion of the leg supporting members 144, 145.

A driving member 161 is disposed forwardly of the frame 152 and is rotatably mounted in said platform 149. Respective pulleys 162, 163 are affixed to the cam 156 and the driving member 161 and have a driving belt 164 disposed or trained around the pulleys for transmitting rotary motion from the driving member to eccentric cam during operation. The driving member 161 has an eccentric cam portion 165 along its periphery 166 and has two oppositely disposed arcuate rack or corrugated portions 167, 168 on its upper surface 169 engageable with the free end 170 of leaf spring 171 mounted at its other end 172 to the platform. (See FIGS. 17 and 19.) During rotation of the driving member 161 the contacting engagement of the free end 170 with the rack portions 167, 168 provides alternate audible signals for arm movement tempo of the swimmer using the device.

Lever 173 is pivotally mounted near its rearward end 174 to the platform adjacent the driving member 161 and is swingable in a horizontal plane about its pivot 176 and has a weight 177 on its forward end 175 of sufficient size to cause tilting or tipping of the entire platform 149 when the weight is rotatably displaced from the center line thereof. The rearward end 174 of the lever 173 is engageable with the cam portion 165 of the driving member 161 during rotation of the latter, whereby lateral reciprocation of the lever is caused about its pivot and corresponding lateral displacement of the weight 177 is effected from the center line. The elastic head rest means 142 is affixed at one end 178 to the upper surface 179 of the platform adjacent the hole 140 at the forward end 141, and extends laterally across the forward end 141, having a movable end 180 which is interconnected by rope and pulley means 181 to the forward end 175 of the lever 173 located in the interior of the platform 149 as shown.

Thus, the elastic head rest means biases the lever to an axially or longitudinally aligned position relative to the platform and returns the lever with its weight 177 to a central position as shown in FIG. 17 when the eccentric cam portion 165 is out of contact with the rear end 174 of lever 173. During displacement of the weight 177, as previously described, the head rest means is stretched in the direction shown by arrow B in FIG. 17, thereby causing the swimmer's head to turn to the left to effect appropriate breathing coordination with the other arm and leg motions.

The fourth embodiment of the invention is shown in FIGS. 21-25. The buoyant platform 182 has a forward opening 183 for receiving the face, head rest means (not shown) adjacent the opening for supporting the head, and a pair of leg supporting members 184, 185 flexibly connected at their inner ends 186, 187 to the main body portion 188 of the platform and are movable in a general vertical plane relative to the platform 182 in much the same manner as described above for the first embodiment. A plurality of concealed air pockets are disposed in the interior of said platform and inflatable to provide adjustable buoyancy and stability, one pocket 189 being located near the front end 190, another pocket 191 being located at one side of the midportion 192 and other pockets 193, 194 being located in respective leg members 184, 185. Conventional valve means 195 are provided for inflating and deflating the pockets and extend exteriorly of the platform for access.

Affixed to the underside 196 of the platform 182, is an elongated cylindrical recess or receptacle 197 centrally disposed thereon and axially aligned therewith which communicates with a plurality of water channels or conduits 198, located within the interior 199 of the platform 182, and interconnects therewith at axially spaced positions along the upper portion 200 of the recess 197. One of said water channels 201 communicates with water pressure nozzle 202 opening on the upper surface 203 of the platform 182 adjacent the opening 183 at the head rest position. Two other channels 204, 205 communicate with respective nozzles 206, 207 opening on the upper surface 203 adjacent respective shoulder positions. Another channel 208 opens into a confined space 209 containing the air pocket 191, such space also having another opening 210 which will be described hereinafter. Two other channels 211, 212 extend rearwardly into the leg supporting members 184, 185 and also have respective additional openings 213, 214, axially spaced to the rear.

A hollow cylindrical distributing valve member 215 is rotatably disposed in said recess 197 and has a forward water inlet section 216 and a rearward water discharge section 217. A water-driven turbine means 218 is disposed on the periphery 219 of said valve member 215 near the junction of the two sections 216, 217. The turbine means causes rotation of the valve member at a preselected constant speed in response to water under pressure which is directed to its rotor blades 220 by any conventional pumping means (not shown). The inlet section 216 of the valve member 215 has holes 221 in its surface 222 at axially spaced positions corresponding to the locations of channels 201, 204, 205, 208, 211 and 212, such holes 221 being radially oriented relative to one another in accordance with the time relation desired for delivery of water to the respective aforementioned channels. The discharge section 217 also has holes 223 registrable with corresponding openings 210, 213, and 214 at preselected discharge times for exhausting water from the confined space 209 and the leg member channels 211, 212 to the exterior of the platform.

The alternate delivery and discharge of water in the leg member channels 211, 212 causes alternate reciprocal motion of the leg members 184, 185 and similar delivery and discharge of water to the confined space 209 imparts timed rolling motion to the platform.

The air pockets 191 and 193, 194 in the latter channels provide effective expelling force in aid of discharge of water from the respective channels. Likewise, the timed delivery of water to each of the nozzles 202, 206 and 207 provides signals to the student indicating desired movement of that particular portion of the body in appropriate coordination for the execution of swimming strokes.

A flexible fluid-type pad (not shown) is provided on said head rest means for coordinated operation with the other parts of the water system in a similar fashion to that described for the first embodiment for applying turning force to the student's head.

From the above it can be seen that a new and novel apparatus is provided for giving swimming instruction, either on an individual basis or in classes whereby rhythmic coordination of the limbs and proper swimming strokes and leg movement can be learned with a minimum of supervision. Furthermore, such insturction is now made possible under actual normal swimming conditions to accelerate the development of confidence in the swimming student. The device further provides unlocalized body support and does not force the swimmer's motions, but permits him to gradually yet rapidly develop the proper movements. The device can be constructed of inexpensive materials, is light, portable and easily stored in a minimum of space. No complicated machinery is involved nor, because of its simplicity of structure, is maintenance a problem.

While certain embodiments of the invention have been shown and described, it is to be understood that variations and additions can be made by those skilled in the art without departing from the scope and spirit of this invention.

I claim:

1. An aquatic device for giving swimming instruction comprising an elongated buoyant platform adapted to receive the body of a swimming student and being dimensioned to provide unobstructed use of the arms in executing swimming strokes and at least limited freedom of the legs for kicking, said platform having an opening for receiving the face, head rest means adjacent said opening for supporting the head, and a plurailty of fluid expelling means on said platform for releasing fluid under pressure intimed relation to indicate to the student appropriate coordination of the limbs in executing swimming strokes.

2. A swimming student's floating support comprising an elongated buoyant platform having an open area for receiving the face and an adjustable head rest means lying within said area for supporting the head, said head rest means consisting of a plurality of elongated flexible members disposed across said area and affixed to the platform at their ends, each of said flexible members being reciprocably shiftable from a forward to a rearward position, whereby the face receiving portion of said area can be adjusted longitudinally with respect to said platform to accommodate different sizes of students, and means on said platform for indicating to the student appropriate coordination of the limbs in executing swimming strokes.

3. An aquatic device for giving swimming instruction comprising an elongated buoyant platform adapted to receive the body of a swimming student and being dimensioned to provide unobstructed use of the arms in executing swimming strokes and at least limited freedom of the legs for kicking, said platform having an opening for receiving the face, head rest means adjacent said opening for supporting the head, a pair of leg supporting members flexibly connected to said platform and movable relative thereto, a plurality of air pockets disposed in said platform and inflatable to provide adjustable buoyancy and stability, a plurality of water outlets disposed at spaced positions on said paltform, an internal cylinder centrally disposed in said platform and axially aligned therewith, a hollow cylindrical distributing valve member rotatably disposed in said cylinder, said valve member having external mechanical connecting means and water inlet connection means, water channels in said platform interconnecting each of said nozzles with said cylinder at axially spaced positions therealong, said valve member having holes in its surface at corresponding axially spaced positions, said holes being radially oriented relative to one another in accordance with the time relation desired for delivery of water to the respective channels, the timed delivery of water to each of the water outlets providing a signal for the student indicating desired movement of that particular portion of the body in proper coordination with the other portions of the body for the execution of swimming strokes.

4. An aquatic device for giving swimming instruction comprising an elongated buoyant platform adapted to receive the body of a swimming student and being dimensioned to provide unobstructed use of the arms in executing swimming strokes and at least limited freedom of the legs for kicking, said platform having an opening for receiving the face, head rest means adjacent said opening for supporting the head, a pair of leg supporting members flexibly connected to said platform and movable relative thereto, a plurality of air pockets disposed in said platform and inflatable to provide adjustable buoyancy and stability, a plurality of water outlets adjacent positions on the platform receiving the head, the shoulders, the trunk, and the feet respectively, an internal cylinder centrally disposed in said platform and axially aligned therewith, a hollow cylindrical distributing valve member rotatably disposed in said cylinder, said valve member having external mechanical connecting means and water inlet connection means, means affixed to said mechanical connection means for rotating said valve member at a preselected constant speed, pump means connected to said water inlet connection means for delivering water to the interior of said valve member, water channels in said platform interconnecting each of said nozzles with said cylinder at axially spaced positions therealong, said valve member having holes in its surface at corresponding axially spaced positions, said holes being radially oriented relative to one another in accordance with the time relation desired for delivery of water to the respective channels, the timed delivery of water to each of the water outlets providing a signal for the student indicating desired movement of that particular portion of the body in proper coordination with the other portion of the body for the execution of swimming strokes.

5. A swimming student's floating support comprising an elongated buoyant platform having an open area near its forward end for receiving the face and an adjustable head rest means lying within said area for supporting the head, said head rest means consisting of a plurality of pneumatic tubes laterally disposed across said area in side by side relation to one another and affixed to the platform at their ends, the intermediate portions of each of said tubes being of greater length than the area and reciprocably shiftable from a forward to a rearward position, whereby the face receiving portion of said area can be adjusted longitudinally with respect to said platform to accommodate different sizes of students, and a plurality of fluid expelling means on said platform for releasing fluid under pressure in timed relation to indicate to the student appropriate coordination of the limbs in executing swimming strokes.

6. An aquatic device for giving swimming instruction comprising an elongated buoyant platform adapted to receive the body of a swimming student and being dimensioned to provide unobstructed use of the arms in executing swimming strokes and at least limited freedom of the legs for kicking, said platform having a plurality of fluid expelling means on said platform adjacent positions for the head, shoulders, trunk and legs for releasing fluid under pressure in timed relation to indicate to the student appropriate coordination of the parts of the body in executing swimming strokes.

7. A swimming student's floating support comprising an elongated buoyant platform having an opening for receiving the face and an adjustable head rest means lying within said area for supporting the head, said head rest means consisting of a plurality of elongated flexible members disposed across said opening and affixed to the platform at their ends, each of said flexible members being reciprocably shiftable from a forward to a rearward position, whereby the face receiving portion of said opening can be adjusted longitudinally with respect to said platform to accomodate different sizes of students, said platform having a cylindrical recess, a pair of hollow cylindrical valve members rotatably disposed within said recess, water inlet means on said platform for delivering water under pressure to said valve members in said recess, water-driven means affixed to each of said valve members for imparting rotary motion thereto, one of said valve members also having a pair of axially spaced and radially oriented openings therein, respective water channels in said platform having inlet ends at said cylindrical recess in alignment with the respective openings in said latter valve member and rearwardly disposed outlet ends opening externally of the platform adjacent the thigh-receiving portions thereof, a lateral bar having a longitudinally disposed central shaft rotatably mounted in said platform and being engageable with the thighs on either side of the shaft, said bar swingable up and down about said shaft in response to movement of the student's legs in kicking, a pair of rearwardly inclined leg troughs at the rear end of said platform and at a lower elevation than that reached by normal kicking of the legs, and the discharge of water from one of said water-driven means and the outlet ends of said channels being timed in relation to the desired coordination of the arm and leg movement for a preselected swimming stroke.

8. A swimming student's floating support comprising a buoyant platform, a pair of leg supporting members flexibly connected to said platform, gear sectors affixed to each supporting member, a longitudinally slidable frame having respective rack means meshing with said gear sectors and having an opening therein, an eccentric cam rotatably mounted in said platform and disposed within said opening with its periphery in slidable contact with forward and rearward portions of said opening, whereby rotation of said cam imparts reciprocating fore and aft motion to said frame with resultant alternate up and down pivoting motion of said leg supporting members, a driving member disposed forwardly of said frame and rotatably mounted in said platform, means interconnecting said cam and said driving member for imparting rotary motion of the latter to the former, said driving member having an eccentric cam portion, a lever pivotally mounted in said platform adjacent said driving member and swingable in a horizontal plane about its pivot, the rearward end of said lever engageable with said cam portion of said driving member during rotation of the latter whereby lateral reciprocation of said lever is caused about its pivot, a weight on said lever, elastic means affixed to said platform forwardly of said driving member, means interconnecting the forward swinging end of said lever and said elastic means for biasing said lever to an axially aligned position relative to said platform, rotary driving means connected to said driving member for rotating the latter at a preselected constant speed, whereby coordinated movement is imparted to said leg members and said weight to provide desired leg movement signals, and rolling movement of said platform.

9. A swimming student's floating support comprising a buoyant platform having a hole at its forward end adapted to receive the face, a pair of leg supporting members flexibly connected at their inner ends to said platform, gear sectors affixed to each supporting member, a longitudinally slidable frame having respective rack means meshing with said gear sectors and having a rectangular opening therein, an eccentric cam rotatably mounted in said platform and disposed within said opening with its periphery in slidable contact with forward and rearward portions of said opening, whereby rotation of said cam imparts reciprocating fore and aft motion to said frame with resultant alternate up and down pivoting motion of said leg supporting members, a driving member, disposed forwardly of said frame and rotatably mounted in said platform, respective pulleys affixed to said cam and said driving member, a driving belt trained around said pulleys, said driving member having an eccentric cam portion, a lever pivotally mounted near one of its ends in said platform adjacent said driving member and swingable in a horizontal plane about its pivot, the rearward end of said lever engageable with said cam portion of said driving member during rotation of the latter whereby lateral reciprocation of said lever is caused about its pivot, a weight on the forward end of said lever, elastic means affixed to said platform forwardly of said hole, means interconnecting the forward swinging end of said lever and said elastic means for biasing said lever to an axially aligned position relative to said platform, rotary driving means connected to said driving member for rotating the latter at a preselected constant speed, whereby coordinated movement is imparted to said leg members and said weight to provide desired leg movement signals, and rolling movement of said platform.

10. An aquatic device for giving swimming instruction comprising an elongated buoyant platform adapted to receive the body of a swimming student and being dimensioned to provide unobstructed use of the arms in executing swimming strokes and at least limited freedom of the legs for kicking, a pair of leg supporting members flexibly connected to said platform, a plurality of air pockets disposed in said platform and inflatable to provide adjustable buoyancy and stability, a plurality of water outlets disposed on said platform adjacent positions for the head and shoulders thereon, water channels in said platform interconnecting each of said outlets, channels extending into each of said leg supporting members, and a central channel on one side of the middle portion of said platform, the latter channel and each of the leg channels containing one of said inflatable air pockets, distributing valve means in said platform for delivering water to said channels and discharging water therefrom in a preselected time relationship, the alternate delivery and discharge of water in said leg member channels causing alternate reciprocal motion of said leg supporting members, the alternate delivery and discharge of water from said central channel imparting timed rolling motion to said platform and the timed delivery of water to each of the water outlets providing signals to the student indicating desired movement of that particular portion of the body in proper coordination for the execution of swimming strokes.

References Cited in the file of this patent

UNITED STATES PATENTS

| | | |
|---|---|---|
| 1,433,142 | Maurer | Oct. 24, 1922 |
| 1,461,911 | Jordahn | July 17, 1923 |
| 2,109,775 | Hudson | Mar. 1, 1938 |
| 2,173,388 | Barcroft | Sept. 19, 1939 |
| 2,712,139 | Kelly | July 5, 1955 |